(No Model.)
J. F. CALL.
COMBINATION TOOL.
No. 302,097. Patented July 15, 1884.
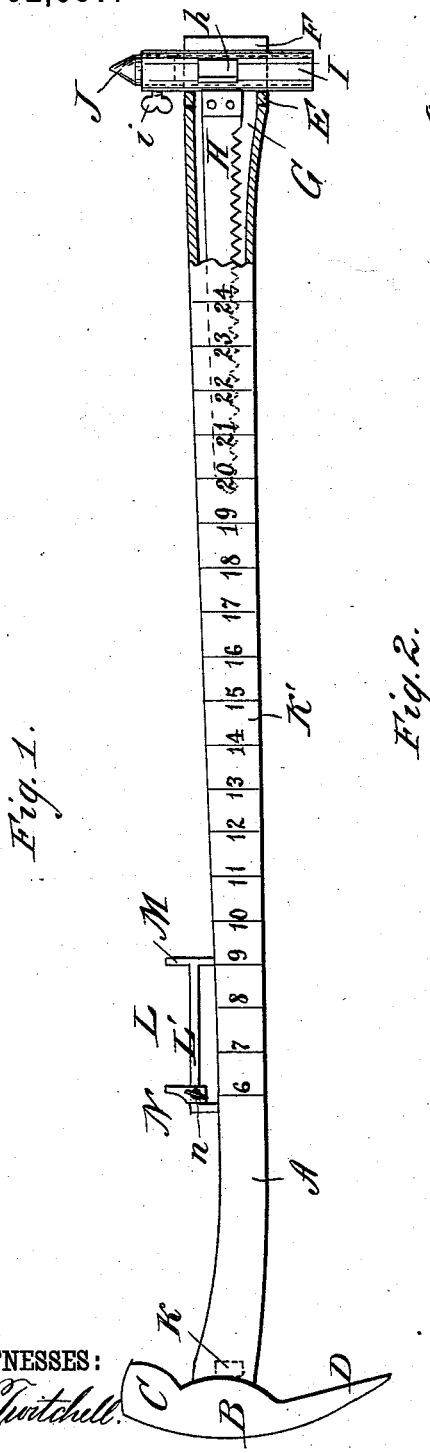
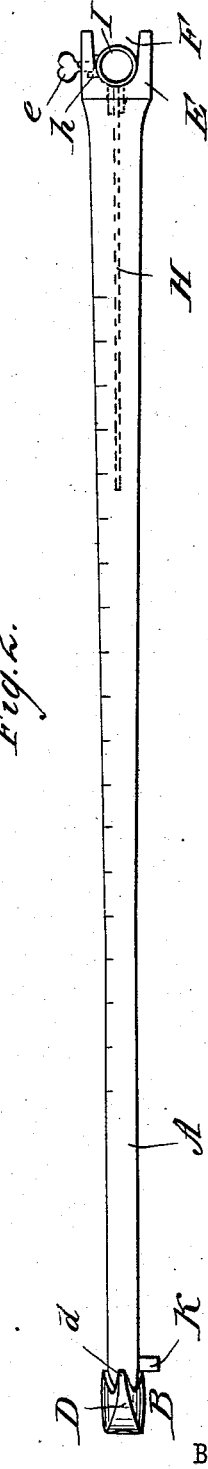
WITNESSES:
Donn Twitchell.
C. Sedgwick
INVENTOR:
J. F. Call
BY Munn & Co
ATTORNEYS.
N. PETERS, Photo-Lithographer, Washington, D. C.

UNITED STATES PATENT OFFICE.

JAMES FRANK CALL, OF CLEAR LAKE, WISCONSIN.

COMBINATION-TOOL.

SPECIFICATION forming part of Letters Patent No. 302,097, dated July 15, 1884.

Application filed April 24, 1884. (No model.)

*To all whom it may concern:*

Be it known that I, JAMES F. CALL, of Clear Lake, in the county of Polk and State of Wisconsin, have invented a new and Improved Combination-Tool, of which the following is a full, clear, and exact description.

Reference is to be had to the accompanying drawings, forming a part of this specification, in which the same letters of reference designate the same parts in the several figures, and in which—

Figure 1 is a side view with parts broken away and in section of my improved combination-tool; and Fig. 2 is a view of the tool, looking at the point of the canter.

The object of this invention is to provide a combination-tool for lumber-graders' use comprising in one tool nearly all the articles needed in surveying lumber.

The invention consists in the combination, with a handle provided with an inch-scale, of a metal head having at one end an ax-blade, and at the opposite end a canter; of a gage fitted for attachment upon the handle for measuring the thickness of lumber; of a saw adapted to fit in a socket in the outer end of the handle, and of a lumber lead-holder forming the handle of a saw, all as will be hereinafter more particularly described.

Upon a suitable handle, A, preferably of strong, tough wood, is fitted at one end a steel head, B, which head is provided at one end with an ax-blade, C, and at the other end with a tapering point or canter, D, which canter is inclined toward the handle, and the end of which is formed with a chisel-edge, $d$. The other end of the handle is squared, and upon it is fitted a metal band, E, across which and the end of the handle is made a groove, F, from the bottom of which groove extends into the handle a recess, G. A saw-blade, H, adapted to fit in the recess G, is provided with a tubular handle, I, adapted to fit in the groove F, and is of such length as to extend to each side of the band E. At one end of the handle I is a thumb-screw, $i$, for holding a lumber-lead, J, in said tubular handle. Upon one side of the handle I, at the center, is secured a flange, $h$, and in one side of the band E is a thumb-screw, $e$, which thumb-screw, when the saw and its tubular handle are placed in the end of the handle A, is adapted to take above the flange $h$ and retain the said saw and handle in place. Upon one side of the handle A, near the head B, is fixed a stud, K, and upon the opposite side of the handle, running from the face of the stud K, is produced in any suitable manner a scale, K', of inches up to twenty-four inches. Upon one edge of the handle, near the head B, is attached a thickness-gage, L, consisting of a bar, L', having two downwardly-projecting prongs adapted to be driven in the handle A. A fixed finger, M, projects upward from one end of the bar L', and a movable finger, N, provided with a thumb-screw, $n$, is adapted to slide upon the bar L'. This gage is to be of a length to measure two inches. The handle A will be about two and a half feet in length. The gage L may be detachably secured upon the handle in any suitable manner.

With this combination-tool the grader need not stoop to turn the lumber, as by entering the point of the canter beneath the board it can be easily turned up for inspection. The grader can always stand over the center cross-pieces of the pile of lumber, from which position the lumber can easily be handled, and breakage is avoided from traveling over the boards, as is ordinarily needful. Frozen boards can be separated by a sharp rap with the point $d$ at one corner of and between the boards. It will also be found useful in lowering boards from the pile. The ax C will be useful for chopping ice from the lumber; also, for trimming off the stub-shorts, and for many other purposes. The gage L is for trying the thickness of the lumber, and may be set to any desired fraction of an inch by adjusting the finger M, for which purpose a scale of fractional parts of an inch can be produced upon the bar L'. This gage is always in place for use. By placing the stud K against one edge of the board the width of the board can be seen at a glance. When lumber is sawed to even-inch widths, for measuring lumber of varying width, the board-scale can be produced upon the handle A instead of the inch-scale shown. The saw H will be found convenient for trimming off the ends of boards. When broken or imperfect, two feet can be measured off with the handle A and the piece sawed off. The recess G lightens the handle. The lumber-lead is securely held in the handle I, and by that in the handle A in a convenient position for use, and will always be where wanted.

Having thus described my invention, what I claim as new, and desire to secure by Letters Patent, is—

1. The combination-tool comprising a graduated handle or bar adapted to serve as a measuring device, and having a head to serve as a canter and cutting-tool, said handle having also a marking-tool, a saw, and a gage, substantially as described.

2. In a combination-tool, the graduated handle comprising the scale upon one side and a stud upon the other side, and a head to serve as a canter and a cutting-tool, in combination with the marking-tool, a saw, and a gage, substantially as set forth.

3. In a combination-tool, the handle having a scale upon one side and a stud upon the other side, and a head having the functions of a canter and a cutting-tool, in combination with a marking device, a saw, and a gage comprising the fixed finger and adjustable finger, substantially as and for the purpose set forth.

4. In a combination-tool, the graduated handle having a marking device, a saw, and a gage, in combination with a head having an ax upon one end and a canter upon the other end, said canter being inclined toward the handle and formed with a chisel-edge, substantially as specified.

5. In a combination-tool, the graduated handle having a head having the functions of a canter and a cutting-tool, a gage, and a saw, in combination with the marking device, with its holder adapted to form the handle of the saw, substantially as and for the purpose set forth.

6. In a combination-tool, the graduated handle having a head adapted to perform the functions of a canter and a cutting device, a gage, and saw, in combination with a marking-tool, with its holder adapted to serve as a handle for the saw, and having means to effect the adjustment of the lead or pencil, substantially as set forth.

7. In a combination-tool, the graduated handle having a head adapted to serve as a cutting-tool and a canter, a marking device, a gage, and a saw, said handle comprising a grooved band detachably connected to the holder of the marking device, substantially as and for the purpose set forth.

JAMES FRANK CALL.

Witnesses:
M. R. INGALLS,
FRANK M. NYE.